United States Patent [19]

Keller

[11] Patent Number: 5,197,276
[45] Date of Patent: Mar. 30, 1993

[54] METHOD FOR PREPARING THE WORKING GAS IN A GAS TURBINE INSTALLATION

[75] Inventor: Jakob Keller, Dottikon, Switzerland
[73] Assignee: Asea Brown Boveri Ltd., Baden, Switzerland
[21] Appl. No.: 728,712
[22] Filed: Jul. 11, 1991

[30] Foreign Application Priority Data

Jul. 27, 1990 [EP] European Pat. Off. ........... 90114429

[51] Int. Cl.$^5$ ............................................. F02C 3/02
[52] U.S. Cl. ................... 60/39.06; 60/39.45
[58] Field of Search ............. 60/39.06, 39.34, 39.45; 417/64

[56] References Cited

U.S. PATENT DOCUMENTS

| | | | |
|---|---|---|---|
| 2,461,186 | 2/1949 | Seippel | 60/39.45 |
| 2,705,867 | 4/1955 | Lewis . | |
| 2,940,656 | 6/1960 | Spalding | 60/39.45 |
| 4,679,393 | 7/1987 | Hellat et al. | 60/39.45 |

FOREIGN PATENT DOCUMENTS 0212181 7/1986 European Pat. Off. .
937689 8/1948 France .

*Primary Examiner*—Louis J. Casaregola
*Attorney, Agent, or Firm*—Burns, Doane, Swecker & Mathis

[57] ABSTRACT

In a method for preparing the working gas in a gas turbine installation, the air prepared by a compressor (1) is mixed, downstream of the compression, with a fuel (4) and then fed to a pressure wave machine (5). This fuel/air mixture fills the revolving rotor cells (11) of this same pressure wave machine (5) in a continuous process. The mixture caught in the rotor cells (11) is then brought to ignition at constant volume. The working gas thus obtained then serves for acting upon a gas turbine (7, 9) placed downstream of the pressure wave machine (5).

5 Claims, 4 Drawing Sheets

METHOD FOR PREPARING THE WORKING GAS IN A GAS TURBINE INSTALLATION

BACKGROUND OF THE INVENTION

1. Field of the Invention

The present invention relates to a method for preparing the working gas in a gas turbine installation in accordance with the preamble of claim 1. It also relates to the design of a pressure wave machine with integrated combustion at constant volume for carrying out this method.

2. Discussion of Background

As high-pressure compressor part of a gas turbine installation, EP-B1-0 212 181 has proposed a pressure wave machine in which the high-pressure gas is produced by self-ignition of a fuel which, for its part, is injected or blown into the cell rotor in the region of the low-pressure channels from fuel nozzles in a housing of the pressure wave machine. The self-ignition here takes place in the manner of detonation when the fuel/air mixture meets a compression wave occurring in the region of the introduction of the fuel. The consequently occurring pressure waves on the one hand produce high-pressure air in the corresponding regions of the rotor space, the said air being fed through a high-pressure air duct to a combustion chamber for the production of driving gas for the gas turbine.

On the other hand, as the cells of the rotor progress in the rotor space, the pressure waves produce an intermediate-pressure driving gas and a low-pressure driving gas in a further region of the rotor space, the said gases being fed via the intermediate-pressure gas duct and high-pressure air duct into the housing, to fuel-injection nozzles or into the housing on the combustion-chamber side, to the intermediate-pressure or the low-pressure part of the turbine.

Compared to a conventional gas turbine, a gas turbine with a pressure wave machine which serves as the high-pressure stage has important advantages which may be outlined as follows:

1. like a piston engine, the pressure wave machine permits very much higher gas temperatures;
2. the pressure wave machine allows combustion at a constant volume;
3. the pressure wave machine makes possible optimum use of transient processes (detonation transients).

While the traditional pressure wave machines, which are used as superchargers in internal combustion engines, utilize only the first effect, the pressure wave machine proposed in EP-B1-0 212 181 is based on a combination of all the effects listed above. However, with many fuels, for example with natural gas, the conditions striven for in the said patent as regards the pressure and temperature for igniting a detonation can only be achieved in extreme situations, which are however not typical of conventional machine construction, for which reason the fundamental potentials as regards advantages in efficiency of a pressure wave machine employed as high-pressure compressor part of a power plant are in practice not achieved with conventional machine construction.

SUMMARY OF THE INVENTION

It is here that the invention is intended to provide a remedy. The invention as defined in the claims is based on the object of maximizing efficiency in a power plant having a pressure wave machine of the type stated at the outset; the result obtained should be at least equal to the optimum results which have been demonstrated with the use of a pressure wave machine in which detonation-like combustion does not occur.

The essential advantage of the invention is to be regarded as the fact that the pressure wave machine allows combustion at constant volume. It therefore results in thorough exploitation of the second advantage mentioned, the first-mentioned advantage, namely that the pressure wave machine permits very much higher gas temperatures, also partially coming into play. Due to the fact that combustion takes place in a closed cell, i.e. at constant volume, it is possible to raise the efficiency of a gas turbine equipped with the pressure wave machine according to the invention to a marked degree in comparison with traditional constant-pressure combustion.

Advantageous and expedient further developments of the novel solution of the object are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
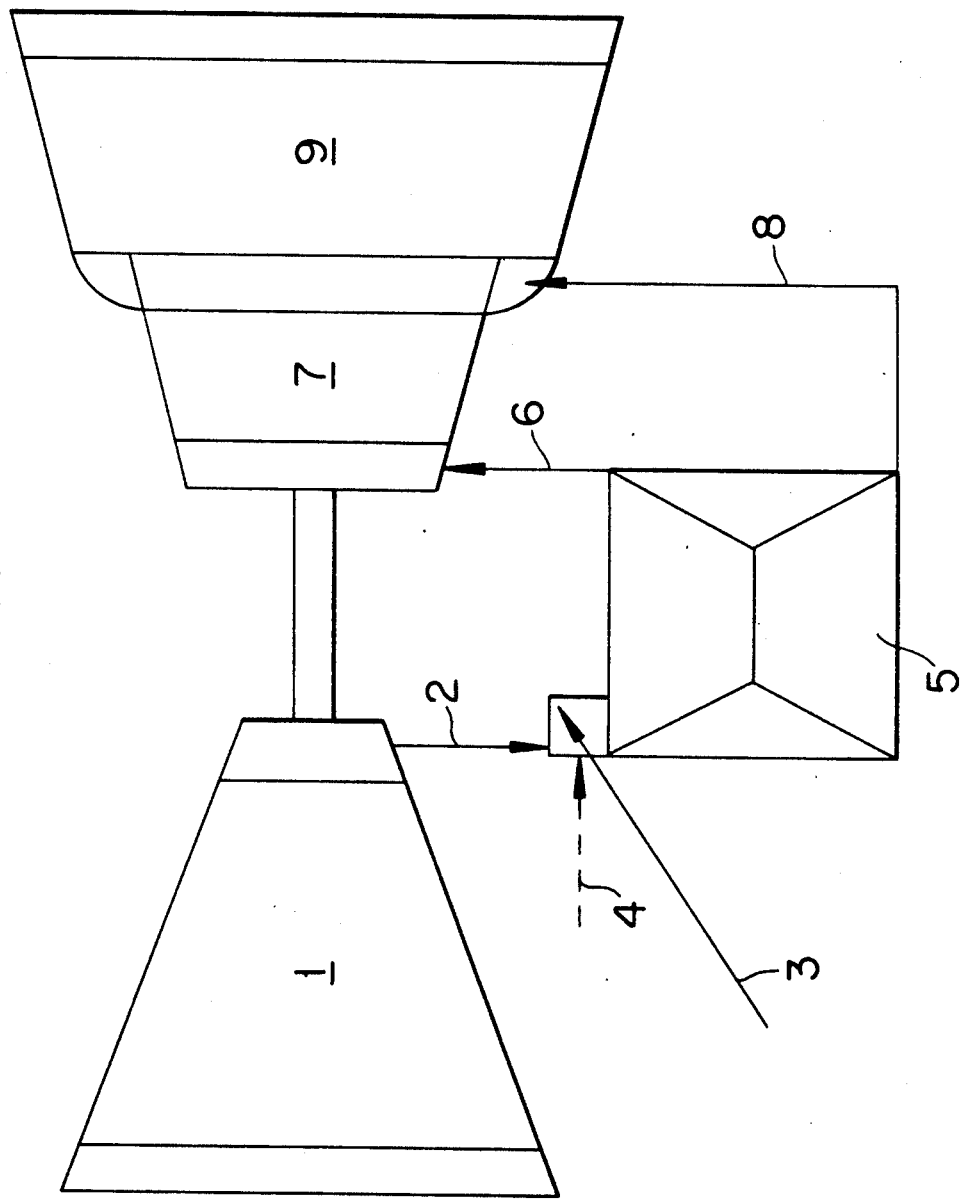
FIG. 1 shows a circuit diagram for the combination of a gas turbine with a pressure wave machine, with integrated combustion at fixed volume.

Referring now to the drawings, wherein like reference numerals designate identical or corresponding parts throughout the several views and in which the direction of flow of the various media is indicated by arrows, in the gas turbine installation depicted schematically in FIG. 1 a low-pressure compressor 1 delivers precompressed air via a low-pressure line 2 into a pressure wave machine 4. The low-pressure line 2 opens first of all into a premixing duct 3, in which a fuel 4 is fed in. As will be illustrated in detail subsequently in FIG. 2, a high-pressure turbine 7 and a low-pressure turbine 9 are acted upon by corresponding gases prepared in the pressure wave machine 5, on the one hand via a high-pressure driving-gas line 6 and, on the other hand, via a low-pressure driving-gas line 8. It should be noted that the gas turbine installation can also be characterized by a simplified variant without a low-pressure turbine 9. Such a simplification would be employed primarily in combination processes, where the high exhaust-gas temperature is used for the preparation of live steam.

Figure 2:
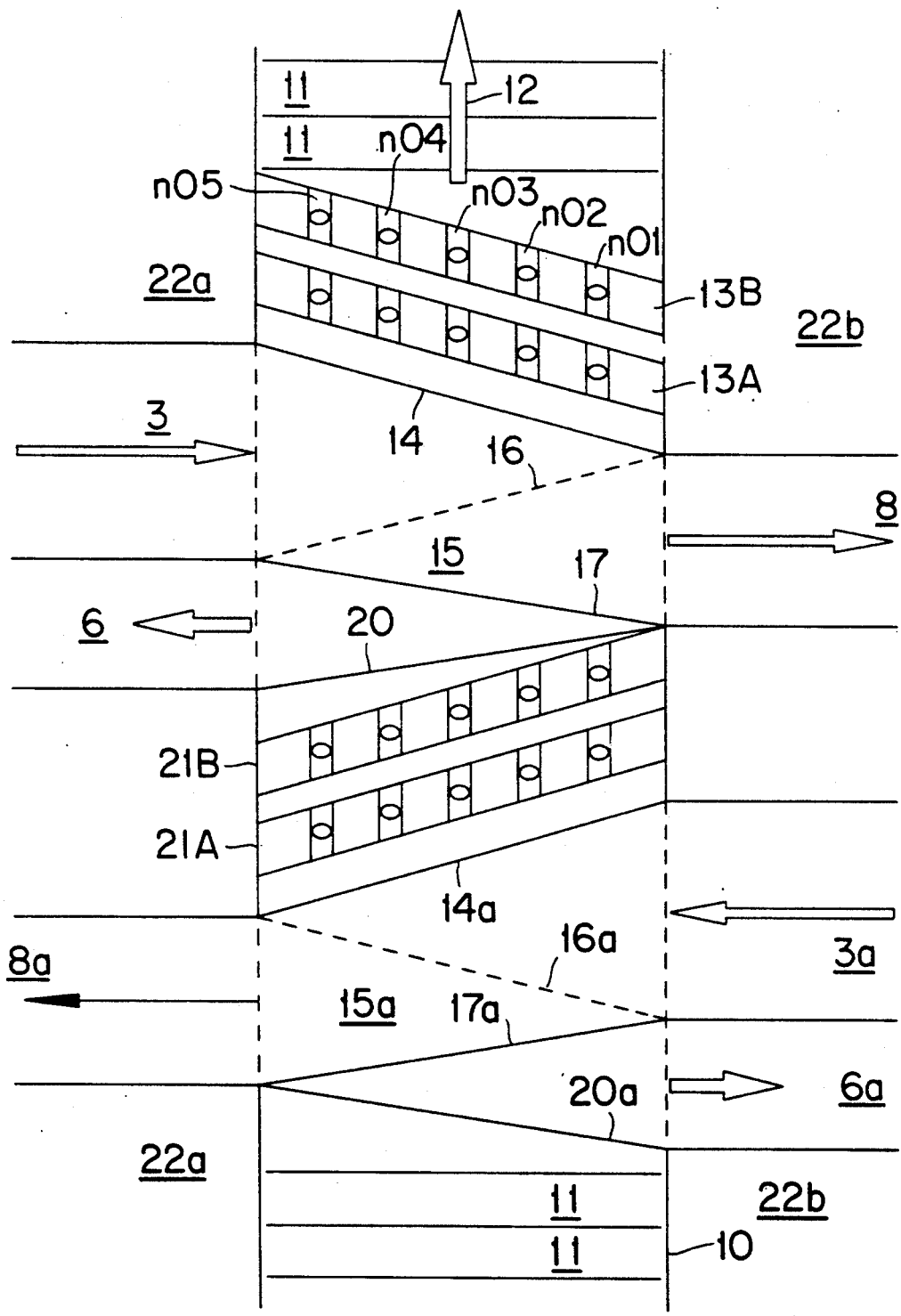
FIG. 2 shows schematically the course of the pressure wave process of the novel pressure wave machine.

FIG. 2 shows, in skeleton form, a development of the cell rotor 10 of the pressure wave machine 5 insofar as it is required for the explanation of the pressure wave process. Of the cell rotor 10 only individual cells 11 are depicted, here in FIG. 2 extending at right angles to the direction of rotation 12 of the cell rotor 10. It is of course also possible for these cells to be arranged obliquely thereto, as described, for example, in EP-B1-0 212 181, and if explanation is required in this connection, attention is drawn to the description provided there. The cell rotor 10 itself runs with very small clearance in a housing 22a, 22b shown only indicatively, the two rotor front sides of the housing 22a, 22b being penetrated by different ducts 3, 3a; 6, 6a; 8, 8a. As FIG. 2 is intended to show in schematic form, the cell rotor 10 runs through two diametrically opposite and symmetrically arranged processes in the direction of rotation 12, as the doubly indicated combustion zones in the region of the ignition loops 13A, 13B and 21A and 21B are intended to symbolize. This configuration has been chosen in order to obtain a uniform temperature distribution of the rotor. The symmetry of the process is also indicated by the fact that the physical and process-engineering components of the two processes bear the same numbering and differ merely in the added letters. Accordingly, only one part of the cycle of the process is described below. The low-pressure air coming from the compressor passes through a premixing section not visible in FIG. 2 (cf. FIG. 3) and enters the range of action of the rotor cells 11 via a premixing duct 3 in the form of a fuel/air mixture. Although the term low-pressure air is used here, this is not to be taken in the absolute sense, being low only in comparison with the other pressure levels in the installation. This air thus enters the cells 11 via the forward part of the premixing duct 3. During this process, the cells 11 revolving past the premixing duct 3 receive a charge rate of the corresponding fuel/air mixture. The filling of the cells 11 to a constant volume is predetermined by the closing edge of the premixing duct 3 in the housing 22a. Reference 14 indicates the course of the shock wave between the closing edge of the premixing duct 3 in the housing 22a and the closing edge of the low-pressure driving-gas line 8 in the housing 22b. The ignition of the mixture, a constant volume of which has been caught in the cells 11, takes place along the rotor 10 closed off at the front sides by the housing body 22a, 22b and is triggered with a series of ignition loops 13A, 13B and 21A, 21B (on the opposite side) respectively, these ignition loops developing a bridge between a plurality of cells 11 parallel to the direction of rotation 12 of the rotor 10. In FIG. 2, 5 individual ignition loops, n01–n05 are depicted by way of example, the said ignition loops covering the entire width of the rotor 10 at regular intervals and giving a corresponding number of ignition stages. The configuration and mode of operation of these ignition loops is represented under FIG. 4 and explained in greater detail there. The number of ignition stages to be provided per cell 11 depends on the respective length of the cell and on the particular operating conditions of the pressure wave machine. The driving gas which is produced in a closed cell at constant volume by means of one or more ignitions of the mixture passes in the subsequent part of the cycle into the high-pressure part of the gas turbine via a high-pressure driving-gas line 6a (cf. in this connection FIG. 1). The driving gases formed by the combustion pass in the further region 15a via a low-pressure driving-gas line 8a and pass into the low-pressure part of the gas turbine (cf. in this connection FIG. 1). Provision can of course be made for the gas turbine to have an intermediate-pressure part as well, which would partially expand the driving gases, although this is not shown here. For such a circuit, reference is made to the statements in publication EP-B1 0 212 181. According to this, these driving gases are expanded in the low-pressure part to a back pressure which corresponds to atmospheric pressure. The change of direction of the velocity guarantees that the expansion waves 20a, 17a running in the driving gas do not produce excessively high flow velocities and nevertheless produce a sufficiently great pressure drop. From an opening edge of the low-pressure driving-gas line 8a in the housing 22a, the expansion wave runs to the closing edge of the high-pressure driving-gas line 6a in the housing 22b and expands the driving gas from a pressure p2 to pressure p1, whereupon it is fed via the low-pressure driving-gas line 8a to the low-pressure part of the gas turbine. (cf. in this connection FIG. 1). The media boundary 16a, which runs from the opening edge of the premixing duct 3a in the housing 22b to the closing edge of the low-pressure driving-gas duct 8a in the housing 22a, here extends over the entire width of the rotor 10, this media boundary 16a not being crossed by expansion waves. This means that the driving gas is forced completely out of the cells 11 and made to flow off. The new phase then begins, the cells 11 revolving past being filled via the premixing duct 3a with the fuel/air mixture in a manner similar to that described above. Accordingly, the cell 11 represents per se a "combustion chamber" which is characterized by a constant volume and is to be configured in such a way that, at maximum load, the driving gases produced in it just reach the permissible blading limiting temperature at the inlet of the high-pressure part of the gas turbine. Downstream of the high-pressure part, the driving gas at pressure p1 from the low-pressure driving-gas line 8 or 8a, which gas may be hotter, is admixed to the partially expanded and correspondingly cooled driving gas, more specifically in such a way that the heated driving-gas mixture again just reaches the limiting temperature of the first stage of the low-pressure part of the gas turbine (cf. in this connection FIG. 1). If the gas turbine does have an intermediate-pressure part in addition, the admixture is performed in a similar manner in accordance with the preceding remarks. It is the aim of these deliberations to achieve a rough approximation for the gas turbine to the isothermal expansion of the Carnot cycle.

Figure 3:
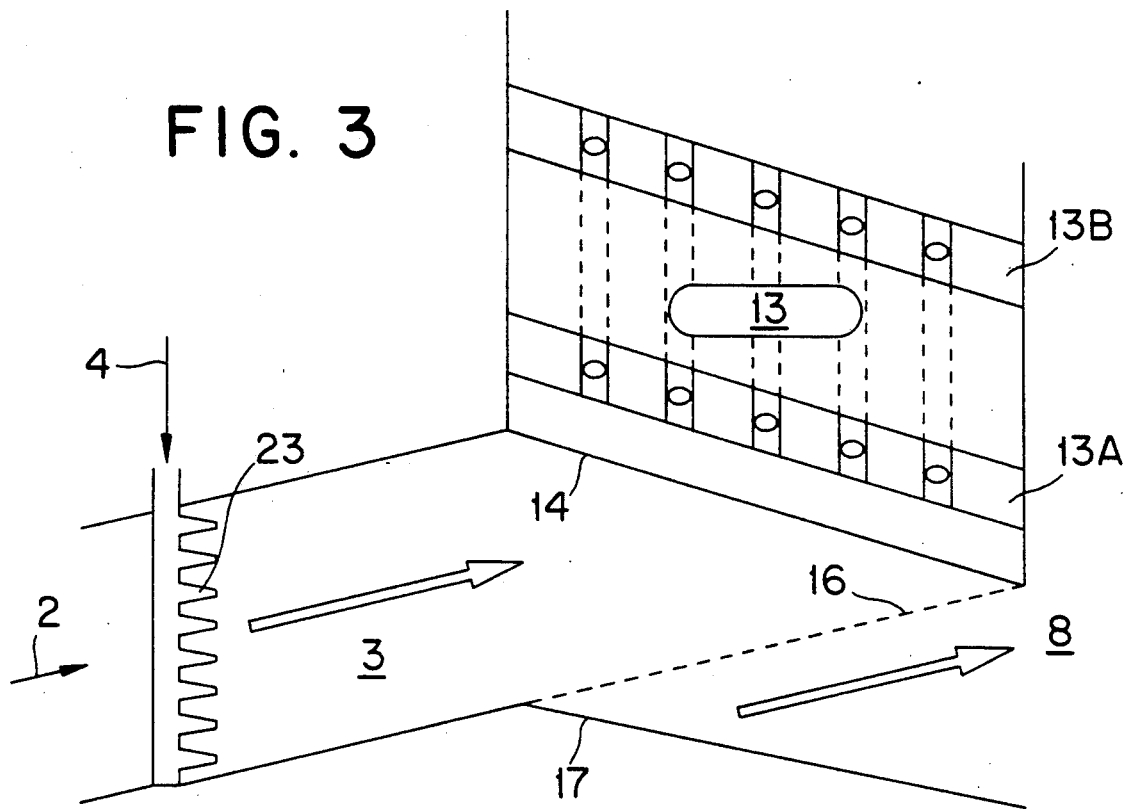
FIG. 3 shows an introduction of the fuel via a premixing duct.

FIG. 3 shows a detail of the premixing duct 3, which can also be premixing duct 3a. The low-pressure air 2 flowing in from the compressor experiences an admixture of, for example, natural gas 4 via a row of injector nozzles 23 uniformly distributed over the entire premixing duct 3, to form a fuel/air mixture. To enable the requirements of a part-load operation to be fulfilled, the injector nozzles 23 can be switched on in stages as fuel distributors. This mode of operation is also very important with a view to low emissions as regards $NO_x$/CO/UHC. In the interests of low $NO_x$ emissions, a completely uniform mixture can be produced at full load. However, it is also possible for a suitable upper region of the premixing duct 3 to be more heavily enriched with fuel to ensure that both the limiting temperature of the high-pressure turbine inlet and also the limiting temperature of the low-pressure turbine inlet are just reached at full load. The remaining figure corresponds to the skeleton development of the cell rotor of the pressure wave machine according to FIG. 2.

Figure 4:
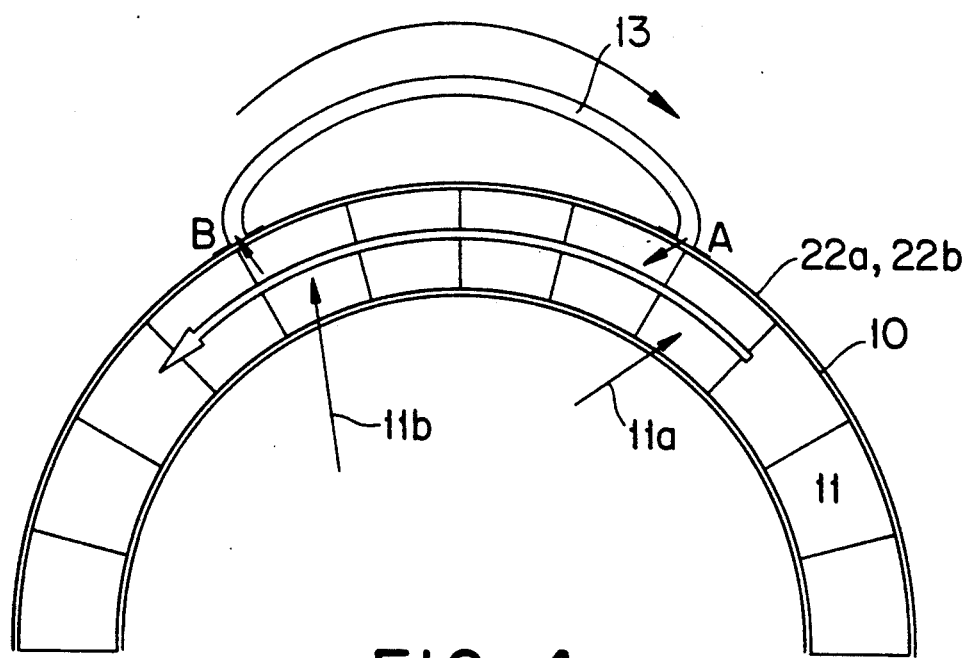
FIG. 4 shows one possibility for continuous ignition.

FIG. 4 shows one possibility of how the continuous ignition of the fuel/air mixture caught in the cells 11 can take place. In the possibility shown here, the machine could first of all be started with an igniter plug ignition in the region of one end of the ignition loop 13. Since the ignition loop 13 approximately covers the region between cells 11a, in which a uniform fuel/air mixture is at intermediate pressure, and cells 11b, which transport the spent gases at high pressure, in the circumferential direction of the cell rotor, the ignition can be automatically initiated by these ignition loops 13 assuming in fact the function of transfer ducts for transporting spent gases at high pressure 6 into cells where a uniform fuel/air mixture at intermediate pressure 3' prevails. At the location of introduction, the spent gases at high pressure 6 bring about a continuous ignition of the combustion mixture in the cells revolving past at that point.

Figure 5:
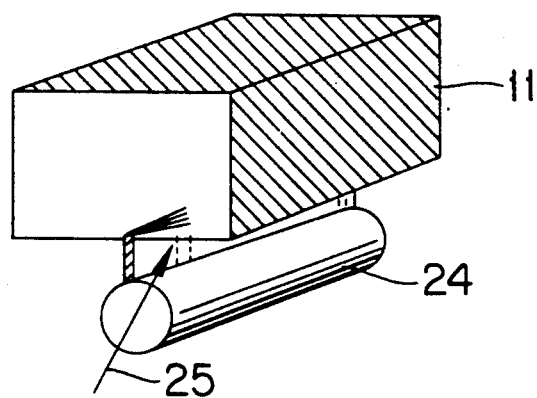
FIGS. 5 and 6 show a further variant of the ignition.
Figure 6:
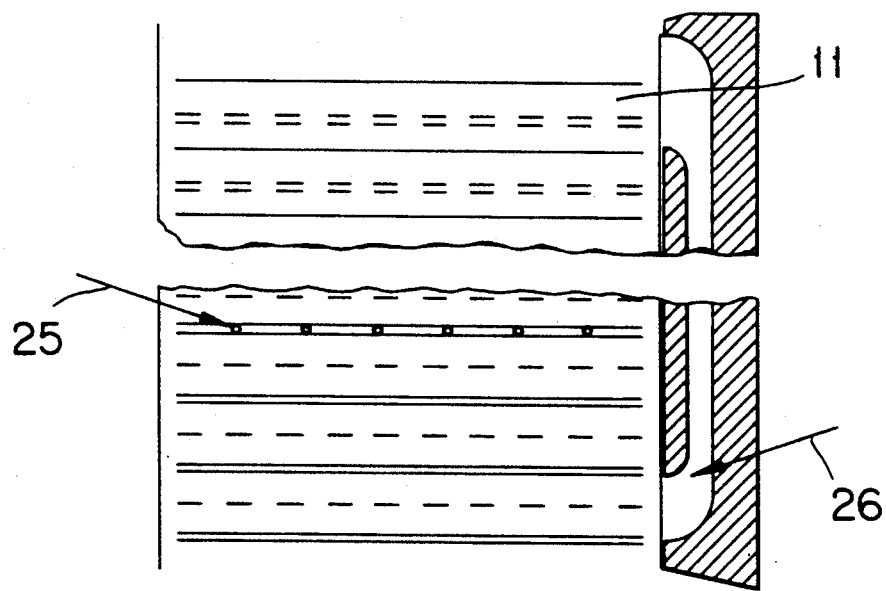

As emerges from FIGS. 5 and 6, a further possibility of an automatic ignition can be envisaged, in which each cell 11 is provided with a small ignition duct 24, which is in contact with the cell 11 via a number of ignition bores 25 but is fed in a manner which is different from that for feeding the cell itself. The connection mentioned of an ignition duct 24 with the cell 11 is revealed in a very illuminating manner in FIG. 6. The ignition ducts would then be emptied by an outlet opening leading to the high-pressure turbine, these openings being correspondingly dimensioned. Also evident from FIG. 6 is a transfer duct 26 which establishes a connection of the cells 11 to the ignition ducts 24.

Obviously, numerous modifications and variations of the present invention are possible in light of the above teachings. It is therefore to be understood that within the scope of the appended claims, the invention may be practiced otherwise than as specifically described herein.

What is claimed as new an desired to be secured by letters patent of the United States is:

1. A method for preparing the working gas in a gas turbine installation which essentially comprises a compressor, a pressure wave machine connected downstream of the compressor and a gas turbine connected downstream of the pressure wave machine, essentially comprising a cell rotor with rotor cells, a housing surrounding the cell rotor at the circumference and at the front sides, which housing is connected via at least one pressure wave machine inlet duct to the compressor and via at least one pressure wave machine outlet duct to the gas turbine, wherein the air prepared in the compressor is mixed with a fuel prior to entry into the pressure wave machine, wherein the fuel/air mixture is introduced into the rotor cells revolving past the end of said at least one pressure wave machine inlet duct, wherein the fuel/air mixture is brought to ignition in the condition of a constant volume indicated by the size of the rotor cells and wherein the gas turbine is acted upon by a working gas forming from the combustion in the rotor cells, wherein a high pressure portion of said working gas exits from said rotor cells through said at least one pressure wave machine outlet duct in a direction opposite to a direction of said fuel/air mixture entering said rotor cells.

2. The method as claimed in claim 1, wherein the ignition of the fuel/air mixture in the rotor cells occurs via at least one ignition point.

3. The method as claimed in claim 1, wherein the ignition of the fuel/air mixture in the rotor cells occurs by an automatic continuous process of the supply of energy internal to the operation and/or by means of ignition aids.

4. A method as claimed in claim 1, wherein part of the working gas forming due to the combustion in the rotor cells acts on a high-pressure gas turbine and wherein the remaining part from the rotor cells acts on a low-pressure gas turbine.

5. The method as claimed in claim 1 wherein downstream of the high-pressure gas turbine, part of the exhaust gases is admixed to the working gas for acting upon the low-pressure gas turbine.

* * * * *